United States Patent [19]

Datta et al.

[11] 4,280,941

[45] Jul. 28, 1981

[54] VIDEO DISCS AND MOLDING COMPOSITIONS THEREFOR

[75] Inventors: Pabitra Datta, Cranbury; Ronald N. Friel, Hamilton Square, both of N.J.

[73] Assignee: RCA Corporation, New York, N.Y.

[21] Appl. No.: 147,577

[22] Filed: May 8, 1980

Related U.S. Application Data

[60] Continuation of Ser. No. 59,472, Jul. 20, 1979, abandoned, which is a division of Ser. No. 959,846, Nov. 13, 1978, Pat. No. 4,241,120.

[51] Int. Cl.$^3$ .............................................. C08L 91/00
[52] U.S. Cl. ................................ 260/23 XA; 252/511; 260/42.49
[58] Field of Search ............. 260/42.49, 42.53, 23XA; 252/502, 511

[56] References Cited

U.S. PATENT DOCUMENTS

| | | | |
|---|---|---|---|
| 3,318,826 | 5/1967 | Bridgeford | 260/42.53 |
| 3,655,825 | 4/1972 | Souder et al. | 260/23 XA |
| 3,833,408 | 9/1974 | Matthies | 117/217 |
| 3,842,194 | 10/1974 | Clemens | 178/6.6 A |
| 3,842,217 | 10/1974 | Clemens | 179/100.4 C |
| 3,909,517 | 9/1975 | Clemens | 178/6.6 A |
| 4,129,536 | 12/1978 | Martin et al. | 260/23 XA |
| 4,151,132 | 4/1979 | Khanna | 260/23 XA |

OTHER PUBLICATIONS

Minoura et al.; "Graft Copolymerization of Styrene with Carbon Black Alkali Metal Complex;" Journal of Applied Polymer Science; 13, 1969.

*Primary Examiner*—Lewis T. Jacobs
*Attorney, Agent, or Firm*—Birgit E. Morris

[57] ABSTRACT

A polyvinyl chloride based molding composition containing polymer grafted conductive carbon particles has good processability, low heat distortion temperature and good dispersion of the conductive particles and can be molded to form video discs of improved electrical properties.

4 Claims, 1 Drawing Figure

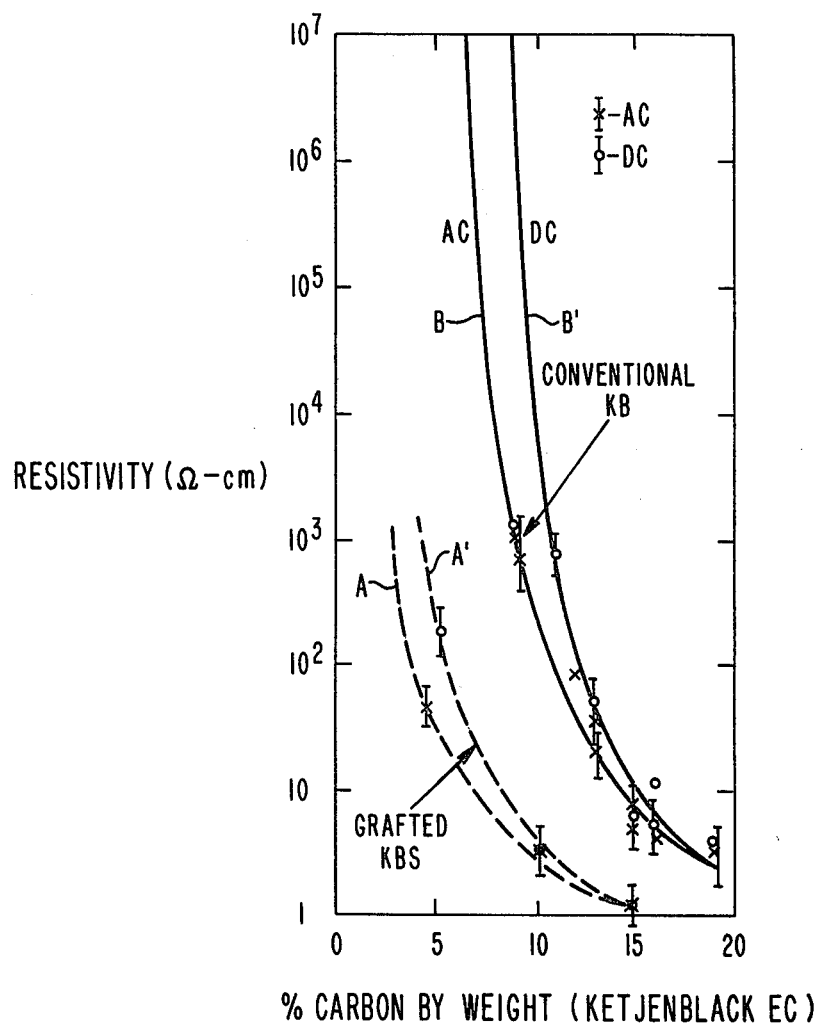

VIDEO DISCS AND MOLDING COMPOSITIONS THEREFOR

This is a continuation of application Ser. No. 059,472, filed July 20, 1979, now abandoned, which is a divisional of Ser. No. 959,846, filed Nov. 13, 1978, now U.S. Pat. No. 4,241,120.

This invention relates to an improved conductive video disc. More particularly, this invention relates to a conductive carbon filled video disc having improved playback performance.

BACKGROUND OF THE INVENTION

Clemens, in U.S. Pat. Nos. 3,842,194, 3,842,217 and 3,909,517, has described a conductive video disc comprising a molded plastic disc having video and audio information in the form of geometric variations in a spiral groove in the disc surface. These discs are coated first with a conductive material, such as a metal, which acts as a first electrode and then with a dielectric layer, such as an inert polymer layer. A metal tipped stylus acts as a second electrode of a capacitor and the information signals are monitored by the stylus which notes changes in capacitance between the stylus and the disc surface as the information, in the form of depressions, passes beneath the stylus when relative motion is established between the disc and the stylus.

Further developments in this system have produced a video disc which is made of a conductive plastic material, e.g., a PVC copolymer resin containing sufficient amounts of conductive particles, such as carbon particles, so that the disc can provide capacitance readout. The carbon particles are surrounded by organic material such as the plastic resin, lubricants, etc. which provide a dielectric surface layer on the conductive particles. This development has eliminated the need for separate coatings of metal and dielectric on the plastic disc and thus has greatly improved the economics of the system. In other developments, video discs which do not require a grooved surface are also being improved. The stylus is maintained in synchronization with an information pattern by means of electrical signals on either side of the information track, rather than physically by means of the groove walls.

The carbon loaded PVC molding compositions known to date are unsatisfactory in certain respects, however. The addition of large quantities of conductive carbon particles to a molding composition greatly increases the melt viscosity of the molten molding mixture and increases the brittleness of the molded disc. In order to obtain uniform disc replicas having very small and precise information patterns, large quantities of plasticizers and processing aids have been added to the molding composition. This unfortunately also contributes to a low heat distortion temperature of the resin and makes it dimensionally unstable in hot weather, leading to rippling and shrinkage which renders the disc unplayable. Thus, research has been continuing to improve the processability of the carbon loaded molding composition which increasing the heat distortion temperature and mechanical properties of the molded disc.

SUMMARY OF THE INVENTION

We have found that carbon black particles modified by grafting polymers onto the particles prior to adding to a PVC based molding composition form molding compositions having reduced melt viscosities, improved processability and conductivity. The resultant molding compositions provide video discs of improved performance.

BRIEF DESCRIPTION OF THE DRAWING

The FIGURE is a graph illustrating changes in resistivity as a function of amount and type of carbon black.

DETAILED DESCRIPTION OF THE INVENTION

The carbon black particles suitable for use herein include highly electrically conductive, finely divided carbon blacks, preferably which have a low bulk density. A presently preferred product is commercially available from the Armak Co., Ketjenblack EC, which has an apparent bulk density of 150 grams per liter and an average particle size of about 300 angstroms. These carbon black particles have a high surface area and high proportion of voids within the particles, as measured by dibutyl phthalate absorption. This characteristic enables current to flow between the conductive particles in a nonconductive polymer matrix in a highly efficient manner. Other carbon blacks can also be employed if they can meet the electrical requirements. Denser carbon particles will usually require higher loading for an equivalent conductivity, which must be no more than 500 ohm-cm at 900 megahertz (MHz) in order for the video signals to be reconstituted on playback with a metal tipped stylus.

According to the present invention the carbon particles are treated to polymer graft them by stirring with a vinyl monomer and thermally polymerizing the monomers.

Suitable monomers include those having vinyl unsaturation which can be thermally polymerized. Thermal polymerization can be carried out at temperatures of about 60° to 200° C., and preferably between 150° to 160° C. Suitable monomers include styrene, vinyl stearate, butyl acrylate and the like and comonomers such as styrene and dodecyl acrylate, styrene and butyl acrylate, styrene and vinyl stearate, butyl acrylate and vinyl stearate and the like.

The monomer and carbon black particles are stirred together to make a homogeneous mixture. If solid monomers are employed, they can be dissolved in a suitable solvent, such as toluene, the solution stirred with the carbon black particles, and the solvent evaporated.

The monomers are then polymerized by heating at temperatures in the above ranges for a sufficient time and then dried.

The resultant polymer grafted carbon particles are then added to a PVC based molding composition. The polymerized grafted carbon particles reduce the melt viscosity of the molding composition when compared to the same quantity of ungrafted carbon particles and also improve the processability of the molding compositions. In addition, the grafted carbon particles, when added to the molding composition, form more uniform dispersions in such compositions than do ungrafted carbon particles. Molded articles prepared from grafted carbon particles have a higher conductivity. Video discs molded from the present molding composition exhibit improved signal to noise ratios.

The polymer grafted conductive carbon particles are mixed with any suitable moldable plastic material. The criteria for choice depends on the physical properties of the material, e.g., moldability, brittleness, heat distortion temperature, melt temperature, melt viscosity, hardness, ageing characteristics and the like, rather than on any particular composition. Many suitable plastic molding compositions are commonly available, including polyvinyl chloride homopolymers, polyvinyl chloride copolymers and terpolymers with comonomers such as polyvinyl acetate, propylene, polyethylene-propylene copolymers, acrylic polymers and the like.

The chosen plastic can be mixed with various additional ingredients including stabilizers, lubricants, processing aids and the like, as is well known.

Antioxidant stabilizers suitable for the present application include organometallic compounds derived from metals including tin, lead, zinc, barium and cadmium, such as dibutyl tin-$\beta$-mercaptopropionate, dibutyl tin maleate and the like. Epoxides, phosphites and alkylated phenols such as t-butyl catechol can also be employed. Generally, about 1-3 percent by weight of the molding composition of a stabilizer is employed.

Internal and external lubricants are also generally added to PVC based molding compositions. Suitable lubricants include fatty acids and esters such as stearic acid, fatty acid esters of alcohols and acids, polyfunctional acid and alcohol esters, soaps including calcium stearate, fatty acid amides such as stearic acid amide, oleamide, ethylene bis stearamide and the like, and silanes such as dimethyl siloxane. Sufficient lubricant is added to prevent high shear heating during processing and to prevent the composition from sticking to the mold during processing. The presently preferred lubricant system is a mixture of an internal and external lubricant.

Minor amounts, e.g., about 1-3 percent by weight of the molding composition, of processing aids, such as polyvinyl chloride terpolymers, polymethylmethacrylate polymers and the like, are also generally added to the present molding composition.

The amounts of additives employed is dependent on the particular base PVC polymer employed and the amount of conductive particles added as well as the molding procedure to be followed, as is known.

For the video disc, a thin dielectric layer must be present at the surface of the disc. This dielectric layer is generally provided by the presence of a thin film of the molding composition plastic around each conductive particle and by the presence of the lubricant in the molding composition which can bleed to the surface, also forming a thin dielectric film. In addition, a thin lubricant film can also be applied as a separate layer on the video disc. This film serves as an added dielectric layer and also serves to reduce stylus wear. One lubricant that has been employed successfully is a methylalkylsiloxane of the formula

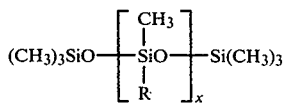

wherein R is an alkyl group of 4 to 20 carbon atoms and x is an integer, which can be applied by spinning from solution or by evaporation.

The polymer grafted conductive particles can be added to the molding composition ingredients either prior to mixing or can be added to the molten molding composition. For example, a Banbury mixer and a Brabender apparatus or a twin screw extruder can be employed to mix the plastic and the polymer grafted conductive particles. The filled molding composition can be sheeted on a two roll mill, pelletized and stored for molding.

For the present application, suitability of the conductive plastic material for video discs is also determined by measuring certain dielectrical properties during playback of the molded disc. A test signal is recorded at a carrier frequency of 5 MHz. Carrier level (C) at 5 MHz, measured at millivolts peak to peak, is a function of the conductivity of the filled molding composition and generally increases at lower resistivities. The prior art metal coated disc can provide recovered carrier level of about 7.4 millivolts peak to peak; a similar level is desirable for the present video disc, although good pictures can be viewed at lower levels of about 1 millivolt peak to peak.

Another property which measures the quality of the recovered video picture is the carrier to noise level ratio (C/N) obtained during playback of a signal recorded at 5 MHz, which ratio should be as high as possible and at least about 40 decibels (dB) for commercially acceptable video.

The invention will be further illustrated by the following Examples but it is to be understood that the invention is not meant to be limited to the details described therein. In the Examples parts and percentages are by weight.

EXAMPLES 1-9

Ketjenblack EC carbon particles were admixed with several monomers by stirring in a high speed blender for two minutes. Solid monomers were first dissolved in toluene, then mixed with the carbon black and dried in a vacuum oven at 80° C. for two hours to remove the solvent. 150 Parts of each of the carbon black-monomer mixtures were heated in an oil bath at 150°-160° C., stirring occasionally for three hours to polymerize the monomers. The products were dried in a vacuum oven at 60° C. for six hours. Weights were recorded before and after drying to determine monomer loss. The initial and final compositions are summarized below in Table I.

TABLE I

| Ex. | Initial Monomer Composition | Final Polymer Composition |
| --- | --- | --- |
| 1 | 77% styrene | 71% polystyrene |
| 2 | 83% styrene | 82% polystyrene |
| 3 | 54% styrene 23% dodecylacrylate | 73% poly(styrene-dodecylacrylate) |
| 4 | 54% styrene 23% butylacrylate | 72% poly(styrene-butyl acrylate) |
| 5 | 54% styrene 23% vinyl stearate | 74% poly(styrene-vinyl stearate) |
| 6 | 10% vinyl stearate (in 60% toluene) | 25% polyvinylstearate |
| 7 | 77% butyl acrylate | 48% polybutyl acrylate |
| 8 | 54% butyl acrylate 23% vinyl stearate | 55% poly(butyl acrylate-vinyl stearate) |
| 9 | 20% diphenylsiloxane-diol (in 50% toluene) | 35% poly(diphenylsiloxane) |

In order to determine that a graft polymer was in fact formed, polymer graft-carbon particle composite samples from Examples 1, 4 and 5 were extracted with boiling tetrahydrofuran for six hour periods. A control mixture was also prepared by dissolving known quantities of polystyrene in tetrahydrofuran, adding carbon black and drying in a vacuum oven at 80° C. for two hours. After each period, the composites and the control were dried and their weight loss determined. The weight loss was attributed to ungrafted polymer. After twenty-four hours of extraction, the final compositions were found to be 42.6 percent polystyrene, 36 percent poly(styrene-butyl acrylate) and 50 percent poly(styrene-vinyl stearate). All of the polymers in the ungrafted control sample were recovered within twenty-four hours. Thus a substantial amount of polymer thermally polymerized in the presence of these carbon particles is grafted and tightly bound to the carbon particles.

EXAMPLE 10

Mixtures containing graft polymerized carbon black particles and a molding composition comprising 95 parts of AP480, a vinyl chloride-8 percent propylene copolymer of Air Products & Chemicals, Inc., two parts of dibutyl tin-$\beta$-mercaptopropionate stabilizer available as T35 from M&T Chemical Co., Inc., 0.75 part of Loxiol G-30, a monofatty acid ester lubricant of varying molecular weight alcohols and acids and 0.25 part of Loxiol G-70, a polyfunctional acid ester lubricant, both available from Henkel International GmbH, and two parts of K-175, an acrylic resin processing aid available from Rohm & Haas Co., were made in a Waring blender by blending for 4 minutes. After cooling to room temperature, 50 part samples were charged to a Brabender Plasticorder maintained at 150° C. and 33 rpm and the melt torque at equilibrium was measured. The data are summarized below where Control A is the molding composition alone without filler, and control B is the molding composition containing 15 percent of ungrafted carbon black. The bandwidth is a measure of processability and elasticity of the resin mixtures. A low bandwidth is an indication of good processability.

TABLE II

| Composition | Carbon Black, Parts | Grafted Polymer, Parts | Molding Composition, Parts | Equilibrium Torque, m/gram | Bandwidth, m/gram |
| --- | --- | --- | --- | --- | --- |
| Control A | — | — | 100 | 3500 | 100 |
| Control B | 15 | — | 85 | 5200 | 350 |
| 1 | 15 | 25 Example 1 | 60 | 4500 | 225 |
| 2 | 15 | 37 Example 3 | 48 | 4050 | 175 |
| 3 | 10 | 24.6 Example 3 | 65.4 | 3600 | 175 |
| 4 | 5 | 12.2 Example 3 | 82.8 | 3300 | 140 |
| 5 | 15 | 35 Example 5 | 50 | 3700 | 330 |
| 6 | 10 | 25 Example 5 | 65 | 3200 | 200 |
| 7 | 5 | 12.5 Example 5 | 82.5 | 3000 | 175 |
| 8 | 15 | 35 Example 4 | 50 | 3600 | 300 |
| 9 | 15 | 14 Example 7 | 71 | 2100 | 300 |
| 10 | 15 | 18 Example 8 | 67 | 2000 | 250 |
| 11 | 15 | 8 Example 9 | 77 | 4900 | 110 |
| 12 | 15 | 5 Example 6 | 80 | 4400 | 300 |
| 13 | 15 | 5 Example 6 | 79 | 3900 | 250 |

EXAMPLE 11

The electrical resistivity of various molding compositions of Example 10 was determined and compared to a molding composition containing 15 percent of ungrafted carbon black particles. The data are summarized below in Table III.

TABLE III

| | Resistivity, ohms-cm | |
| --- | --- | --- |
| Composition | 900 MHz | DC |
| Control B | 6–10 | 20–40 |
| Composition 1 | 2.3 | 2.0 |
| 2 | 1.6 | 1.2 |
| 5 | 1.4 | 1.1 |
| 8 | 1.6 | 1.4 |
| 9 | 2.7 | 2.5 |
| 10 | 2.7 | 3.2 |

TABLE III-continued

| | Resistivity, ohms-cm | |
| --- | --- | --- |
| Composition | 900 MHz | DC |
| 12 | 3.6 | 3.5 |

It is apparent that the polymer grafted carbon particles impart improved electrical properties to molding compositions containing them over equivalent amounts of ungrafted carbon particles.

In addition, resistivities of molding compositions containing polymer grafted carbon black particles are lower for an equivalent amount of ungrafted particles. The Drawing shows a graph of resistivity in ohm-cm, both AC (at 900 MHz) and DC for various loadings of grafted (Curves A and A') and ungrafted (Curves B and B') carbon black, wherein the graft is the styrene-dodecylacrylate copolymer of Example 3 and the ungrafted carbon black molding composition is Control B. Referring to the Drawing, it is apparent that the polymer grafted carbon black molding compositions have lower resistivities than conventional carbon black-containing compositions. Thus less carbon black is required for similar electrical conductance.

EXAMPLE 12

Several video discs were molded from polymer grafted carbon black-containing molding compositions. Sample A contained 15 percent of carbon black, 25 percent of grafted polystyrene and 40 percent of the molding composition described in Example 10. Sample B contained 15 percent of carbon black, 5 percent of grafted vinyl stearate, 1 percent of CW2, an epoxidized fatty acid lubricant commercially available from NL Industries, Inc. and 70 percent of the same molding composition. The materials were mixed in a Brabender single screw extruder and pressed from the video disc master described by Clemens above. A thin layer of a methyl alkyl siloxane lubricant available from General Electric Company as SF-1147, was evaporated onto the surface of the disc.

The resultant discs were played with a diamond stylus in a playback system as described by Clemens. The above discs had a signal to noise ratio of 46–48 dB, 5 megahertz C/N level ratio on playback of 47–48 dB for disc A and 46 dB for disc B. The carrier level was 10–12 and 14 millivolts peak to peak for discs A and B respectively.

Carrier distress time, defined as the amount of time in seconds (but discounting intervals of less than 10 microseconds) during total disc playback when the RF output of the player arm is less than 150 millivolts peak to peak, and the time when the RF output gave above 8.6 MHz or below 3.1 MHz in frequency, indicating a defect. Such defects are noted by the viewer as dropouts. The pass criterion for a video disc is a maximum of 3 seconds in 30 minutes of playback time, and good video quality is considered to be less than 0.3 second in 30 minutes of playback. The time was measured with a group of four discs. The discs were played once, then stressed by storing in a chamber for 44 hours at 90 percent relative humidity and 100° F. and replayed twice. A wear test was then conducted by playing the same outer 10 minute band 40 times and carrier distress time noted for the final play and normalized to 30 minutes by multiplying by 3. In addition, stylus wear was noted by measuring the stylus before and after the above plays. The data are summarized below in Table IV wherein the Control is Control B described in Table II above.

TABLE IV

| Disc | Carrier Distress Time, sec./30 min. | | | | Stylus Wear, $\mu^3$/hour |
|---|---|---|---|---|---|
| | Initial Play | After Stress | | After Wear Test | |
| | | 1st Play | 2nd Play | | |
| A 1 | 0.1 | 3.2 | 0.7 | 0.3 | — |
| A 2 | 0.4 | 4.2 | 0.5 | 0.4 | 0.04 |
| A 3 | 0.2 | 2.1 | 1.3 | 0.3 | 0.05 |
| B 1 | 0.1 | 4.1 | 0.5 | 0.6 | — |
| B 2 | 0.1 | 5.1 | 1.3 | 0.6 | 0.02 |
| B 3 | 0.3 | 3.8 | 0.7 | 1.2 | — |
| B 4 | 0.2 | 1.9 | 0.7 | 0.3 | 0.00 |
| Control B | .1–1 | 3–10 | 1–2 | 1–.3 | .08 |

We claim:

1. In a conductive molding composition comprising a polyvinyl chloride polymer, a solid mercapto tin stabilizer, an acrylic processing aid, an internal lubricant and a sufficient amount of conductive particles so that the composition has a bulk resistivity below about 500 ohm-cm at 900 MHz, the improvement which comprises employing as said conductive particles polymer grafted carbon particles wherein said polymer is a thermally polymerized polymer of a monomer having vinyl unsaturation, and wherein the ungrafted particles have an apparent bulk density of 150 grams per liter.

2. A composition according to claim 1 wherein said lubricant is a mixture of two lubricants, one an ester wax of monofatty acids and alcohols and the other an ester wax of polyfunctional acids and alcohols.

3. A composition according to claim 1 which contains from about 1–3 percent by weight of said molding composition of said stabilizer.

4. A composition according to claim 1 wherein said processing aid is present in an amount of from 1–3 percent by weight of the molding composition.

* * * * *